(12) United States Patent
Lee et al.

(10) Patent No.: US 12,450,801 B2
(45) Date of Patent: Oct. 21, 2025

(54) TEXT RECOGNITION METHOD AND APPARATUS BASED ON HAND INTERACTION FOR AR GLASSES

(71) Applicant: ELECTRONICS AND TELECOMMUNICATIONS RESEARCH INSTITUTE, Daejeon (KR)

(72) Inventors: Jong-Bae Lee, Daejeon (KR); Jeung-Chul Park, Daejeon (KR); Wook-Ho Son, Daejeon (KR); Beom-Ryeol Lee, Daejeon (KR); Yong-Ho Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 187 days.

(21) Appl. No.: 18/367,702

(22) Filed: Sep. 13, 2023

(65) Prior Publication Data
US 2024/0242407 A1    Jul. 18, 2024

(30) Foreign Application Priority Data
Jan. 18, 2023    (KR) .......... 10-2023-0007158

(51) Int. Cl.
*G06T 11/60*    (2006.01)
*G06F 3/04883*    (2022.01)
(Continued)

(52) U.S. Cl.
CPC .......... *G06T 11/60* (2013.01); *G06F 3/04883* (2013.01); *G06T 5/50* (2013.01); *G06T 5/70* (2024.01); *G06T 7/73* (2017.01); *G06V 10/7715* (2022.01); *G06V 10/774* (2022.01); *G06V 20/20* (2022.01); *G06V 30/1613* (2022.01); *G06T 2200/24* (2013.01); *G06T 2207/10024* (2013.01)

(58) Field of Classification Search
CPC ....................................... G06T 11/60
See application file for complete search history.

(56) References Cited

U.S. PATENT DOCUMENTS 9,412,013 B2    8/2016   Ryu et al.
2013/0283214 A1  10/2013   Kim et al.
(Continued)

FOREIGN PATENT DOCUMENTS

KR    10-2018-0122927 A   11/2018
KR    10-2019-0028963 A    3/2019
KR       10-1988037 B1    6/2019

OTHER PUBLICATIONS

Baoguang Shi et al., "Robust Scene Text Recognition with Automatic Rectification", 2016 IEEE Conference on Computer Vision and Pattern Recognition (CVPR), Mar. 12, 2016.

*Primary Examiner* — Shivang I Patel
(74) *Attorney, Agent, or Firm* — LRK PATENT LAW FIRM

(57) ABSTRACT

Disclosed herein are a text recognition method and apparatus based on hand interaction for AR glasses. The text recognition method based on hand interaction for AR glasses includes collecting RGB images, extracting hand joint information from the RGB images, generating a text image based on the hand joint information, recognizing text from the text image, and outputting the recognized text.

16 Claims, 11 Drawing Sheets

(51) Int. Cl.
   *G06T 5/50*     (2006.01)
   *G06T 5/70*     (2024.01)
   *G06T 7/73*     (2017.01)
   *G06V 10/77*    (2022.01)
   *G06V 10/774*   (2022.01)
   *G06V 20/20*    (2022.01)
   *G06V 30/16*    (2022.01)

(56) References Cited

U.S. PATENT DOCUMENTS

2016/0378195 A1* 12/2016 Lefebvre ............... G06V 10/46
                                                    382/156
2018/0307303 A1* 10/2018 Powderly ................ G06F 3/017
2023/0341948 A1* 10/2023 Colascione ........... G06T 19/006

\* cited by examiner

TEXT RECOGNITION METHOD AND APPARATUS BASED ON HAND INTERACTION FOR AR GLASSES

CROSS REFERENCE TO RELATED APPLICATION

This application claims the benefit of Korean Patent Application No. 10-2023-0007158, filed Jan. 18, 2023, which is hereby incorporated by reference in its entirety into this application.

BACKGROUND OF THE INVENTION

1. Technical Field

The present disclosure relates generally to a method and apparatus for recognizing text through hand interaction on augmented reality (AR) content.

2. Description of Related Art

A text input system based on currently commercialized augmented reality mainly adopts a method in which a virtual input key board is generated on a user interface (UI) such as Hololens AR glasses of Microsoft Corporation and then text is input through the keyboard, or a method in which text is input through an actually present apparatus (e.g., a mobile phone) or the like such as Nreal Light AR glasses of Nreal Corporation. For the case of using the virtual input apparatus like Hololens, there is a problem that wrong inputs frequently occur when the quality of hand interaction is lowered or the size of the UI is not sufficiently large. For the case of inputting through an actual apparatus like Nreal Light, there is a problem that the equipment is required to be always carried.

Among them, for the case of using the virtual input apparatus, the hand interaction quality of a head-mounted display (HMD)-type apparatus, which includes an its own computing apparatus and multiple sensors, is not relatively lowered, but an apparatus for glasses has low hand interaction quality to cause frequent wrong inputs.

SUMMARY OF THE INVENTION

Accordingly, the present disclosure has been made keeping in mind the above problems occurring in the prior art, and an object of the present disclosure is to provide a text recognition method and apparatus for addressing wrong input or misrecognition issues caused by low hand interaction quality in an apparatus for Android-based glasses with limited computing resources.

In accordance with an aspect of the present disclosure to accomplish the above object, there is provided a text recognition method, including collecting RGB images, extracting hand joint information from the RGB images, generating a text image based on the hand joint information, recognizing text from the text image, and outputting the recognized text.

Extracting the hand joint information may include estimating a hand gesture from the RGB images, and extracting the hand joint information based on the hand gesture.

Generating the text image may include extracting a raycast point value based on the hand joint information, performing image stabilization based on the raycast point value to generate an output value, and rendering a line on a canvas User Interface (UI) based on the output value, and converting the rendered canvas UI into rendered image texture to generate texture image information.

The image stabilization may be performed to include inputting the raycast point value to a raycast point queue, removing first k point values and last k point values among the raycast point values input to the raycast queue, and applying a moving average of the raycast point queue from which the first k point values and the last k point values are removed, and outputting an output value.

Recognizing the text may include preprocessing the text image, and inferring the text by inputting the preprocessed text image to a first machine-learning model.

Preprocessing the text image may include converting the text image into a grayscale image, adjusting a resolution of the grayscale image, normalizing the image of which the resolution is adjusted so that pixel values of the image are 0 to 1, and converting the normalized image into a tensor.

Inferring the text may include extracting structural features of the text by inputting the preprocessed text image to a second machine-learning model, converting the structural features of the text into features of one dimension that is a dimension of the text, extracting features for respective terms by inputting the converted one-dimensional features to a third machine-learning model, and inferring the text based on the features for respective terms.

The second machine-learning model may be composed of two-dimensional convolution layers, and the third machine-learning model may be composed of one-dimensional convolution layers.

Converting the structural features of the text into features of one dimension that is a dimension of the text may be performed using an average value, a maximum value, and a variance value of the features.

Inferring the text based on the features for respective terms may be performed based on a Dynamic Time Warping (DTW) loss function and a Connectionist Temporal Classification (CTC) loss function.

In accordance with another aspect of the present disclosure to accomplish the above object, there is provided a text recognition apparatus, including memory configured to store a control program for text recognition, and a processor configured to execute the control program stored in the memory, wherein the processor is configured to collect RGB images, extract hand joint information from the RGB images, generate a text image based on the hand joint information, recognize text from the text image, and output the recognized text.

The processor may be configured to estimate a hand gesture from the RGB images and extract the hand joint information based on the hand gesture.

The processor may be configured to extract a raycast point value based on the hand joint information, perform image stabilization based on the raycast point value to generate an output value, render a line on a canvas User Interface (UI) based on the output value, and convert the rendered canvas UI into rendered image texture to generate texture image information.

The processor may be configured to input the raycast point value to a raycast point queue, remove first k point values and last k point values among the raycast point values input to the raycast queue, apply a moving average of the raycast point queue from which the first k point values and the last k point values are removed, and output an output value to perform the image stabilization.

The processor may be configured to preprocess the text image, and infer the text by inputting the preprocessed text image to a first machine-learning model.

The processor may be configured to convert the text image into a grayscale image, adjust a resolution of the grayscale image, normalize the image of which the resolution is adjusted so that pixel values of the image are 0 to 1, and convert the normalized image into a tensor.

The processor may be configured to extract structural features of the text by inputting the preprocessed text image to a second machine-learning model, convert the structural features of the text into features of one dimension that is a dimension of the text, extract features for respective terms by inputting the converted one-dimensional features to a third machine-learning model, and infer the text based on the features for respective terms.

The second machine-learning model may be composed of two-dimensional convolution layers, and the third machine-learning model is composed of one-dimensional convolution layers.

The processor may be configured to convert the structural features of the text into features of one dimension that is a dimension of text using an average value, a maximum value, and a variance value of the features.

The processor may be configured to perform an operation of inferring the text based on the features for respective terms based on a Dynamic Time Warping (DTW) loss function and a Connectionist Temporal Classification (CTC) loss function.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
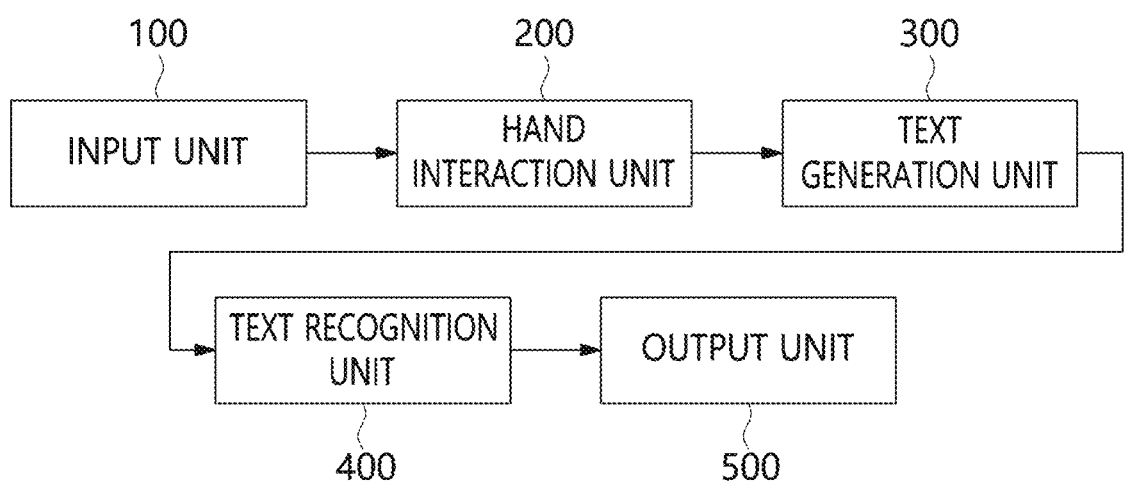
FIG. 1 is a block diagram illustrating a text recognition apparatus based on hand interaction for AR glasses according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a block diagram illustrating a text recognition apparatus based on hand interaction for AR glasses according to an embodiment.

Referring to FIG. 1, the text recognition apparatus according to an embodiment may include an input unit 100, a hand interaction unit 200, a text generation unit 300, a text recognition unit 400, and an output unit 500.

The input unit 100 may receive RGB images from a forward camera of Nreal glasses. The hand interaction unit 200 may estimate a hand gesture from the input RGB images to extract hand joint information. The text generation unit 300 may use the trajectory of the extracted joint to generate a text image to be used for recognition. The text recognition unit 400 may recognize text based on the generated text image. The output unit 500 may output the recognized text to the Nreal glasses.

Figure 2:
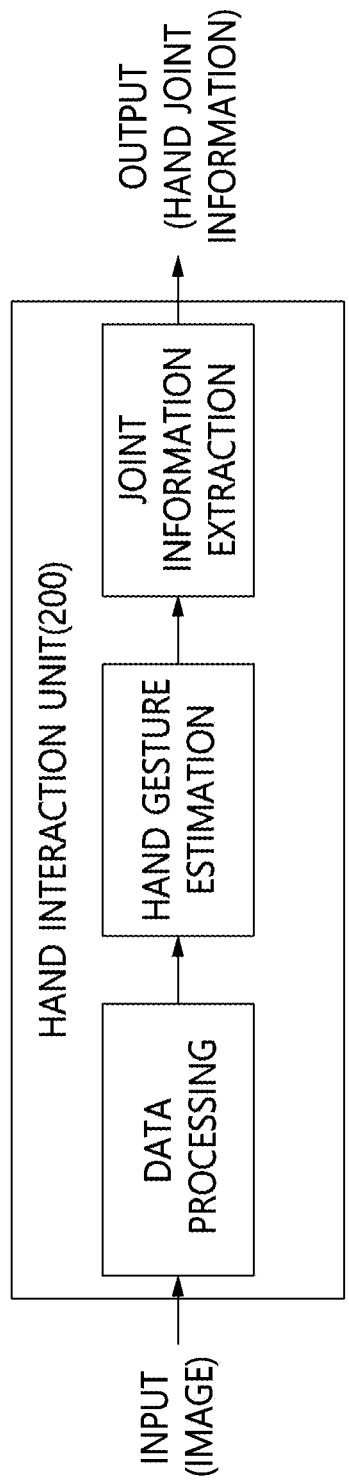
FIG. 2 is a block diagram illustrating a hand interaction unit of a text recognition apparatus based on hand interaction for AR glasses according to an embodiment.

FIG. 2 is a block diagram illustrating a hand interaction unit of a text recognition apparatus based on hand interaction for AR glasses according to an embodiment.

As shown in FIG. 2, the hand interaction unit 200 according to the embodiment may pre-process the input RGB images. The hand interaction unit 200 according to the embodiment may estimate a hand gesture based on the pre-processed images. Here, the hand gesture may be estimated using a machine-learning model. The machine-learning model may be a RetinaFace model, but the type thereof is not limited thereto. The hand interaction unit 200 according to the embodiment may extract the hand joint information based on the hand gesture.

Figure 3:
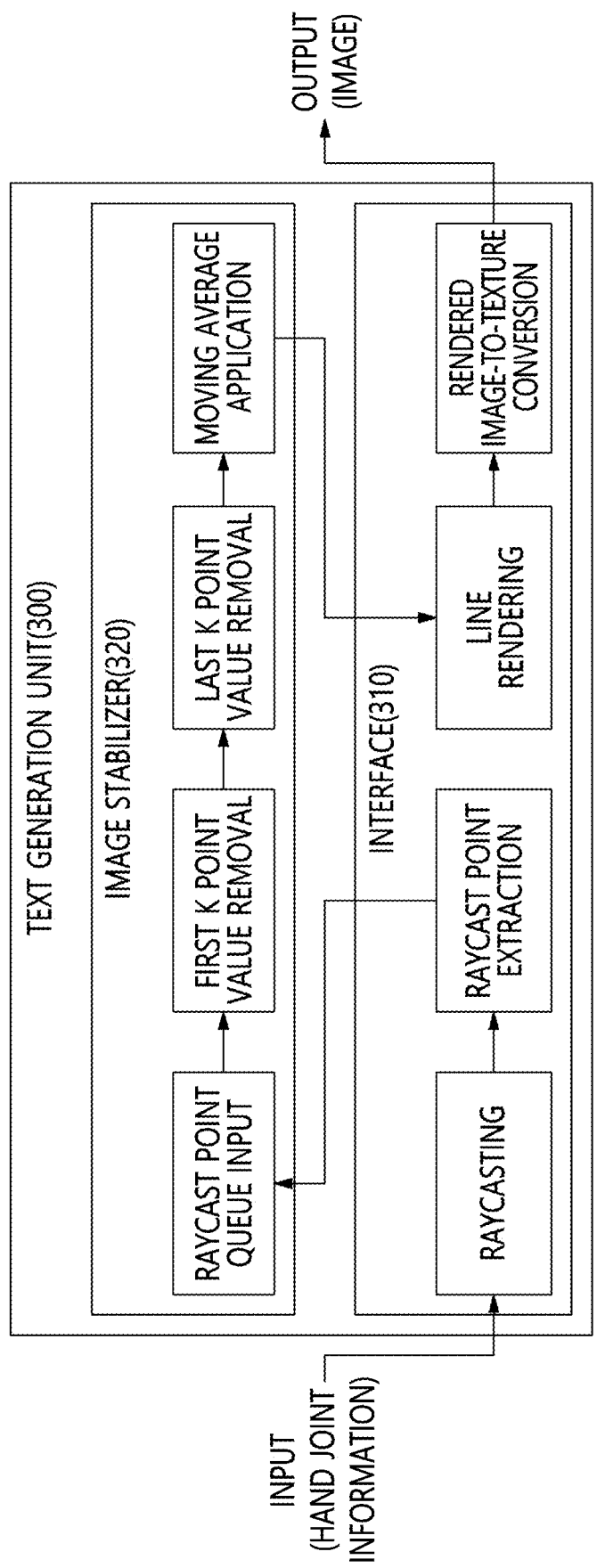
FIG. 3 is a block diagram illustrating a text generation unit of a text recognition apparatus based on hand interaction for AR glasses according to an embodiment.

FIG. 3 is a block diagram illustrating a text generation unit of a text recognition apparatus based on hand interaction for AR glasses according to an embodiment.

As shown in FIG. 3, the text generation unit 300 according to the embodiment may include an interface 310 and an image stabilizer 320.

The interface 310 may interact with a user interface (UI) through the extracted hand joint to input text. The image stabilizer 320 may compensate for wrong input issues generated in the text input.

The interface 310 may use a raycast pointer for the text input. The raycast pointer may be projected from the arm to the wrist.

Figure 4:
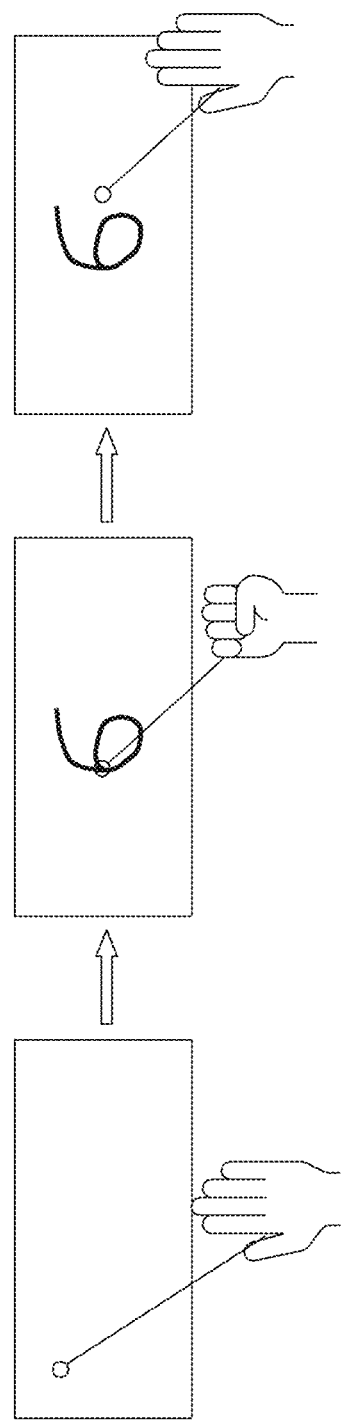
FIG. 4 shows the operation performed in a text generation unit of a text recognition apparatus based on hand interaction for AR glasses according to an embodiment.

FIG. 4 shows the operation performed in a text generation unit of a text recognition apparatus based on hand interaction for AR glasses according to an embodiment.

As shown in FIG. 4, the input may start when a grab gesture is made in a state where the grab gesture has been released, and the input may end when the grab gesture is released.

Referring to FIG. 3 again, the interface 310 may acquire the coordinates of a portion contacted by the raycast pointer when the input starts on a canvas UI. The image stabilizer 320 may insert the coordinate values into a raycast pointer queue to perform image stabilization. The interface 310 may perform a process of drawing a line on the canvas UI using the result of the image stabilization to render the line.

The interface 310 may convert the canvas UI with the drawn line into RenderTexture using a unity camera to finally acquire texture image information.

When the text is being input by the text generator 310, fine shaking occurs due to a hand pose estimation error for each frame, and such a shaking causes degradation of the quality of the text converted into the image, which results misrecognition in the text recognition apparatus. Accordingly, as the quality of the hand interaction becomes further degraded due to the performance or algorithm of the apparatus, or the distance from the input UI becomes greater, such a problem occurs easily.

In addition, a wrong input such as addition of an unnecessary stroke occurs in a process of changing a gesture for controlling the start and end of the input during interaction. In order to prevent such a wrong input, the image stabilization is applied to the text input unit.

First, in order to reduce the wrong input due to a change of gesture during interaction, K point values of each of the start and end of the change process are removed. Secondly, the moving average may be applied to prevent the wrong input caused by the hand pose estimation error.

Figure 5:
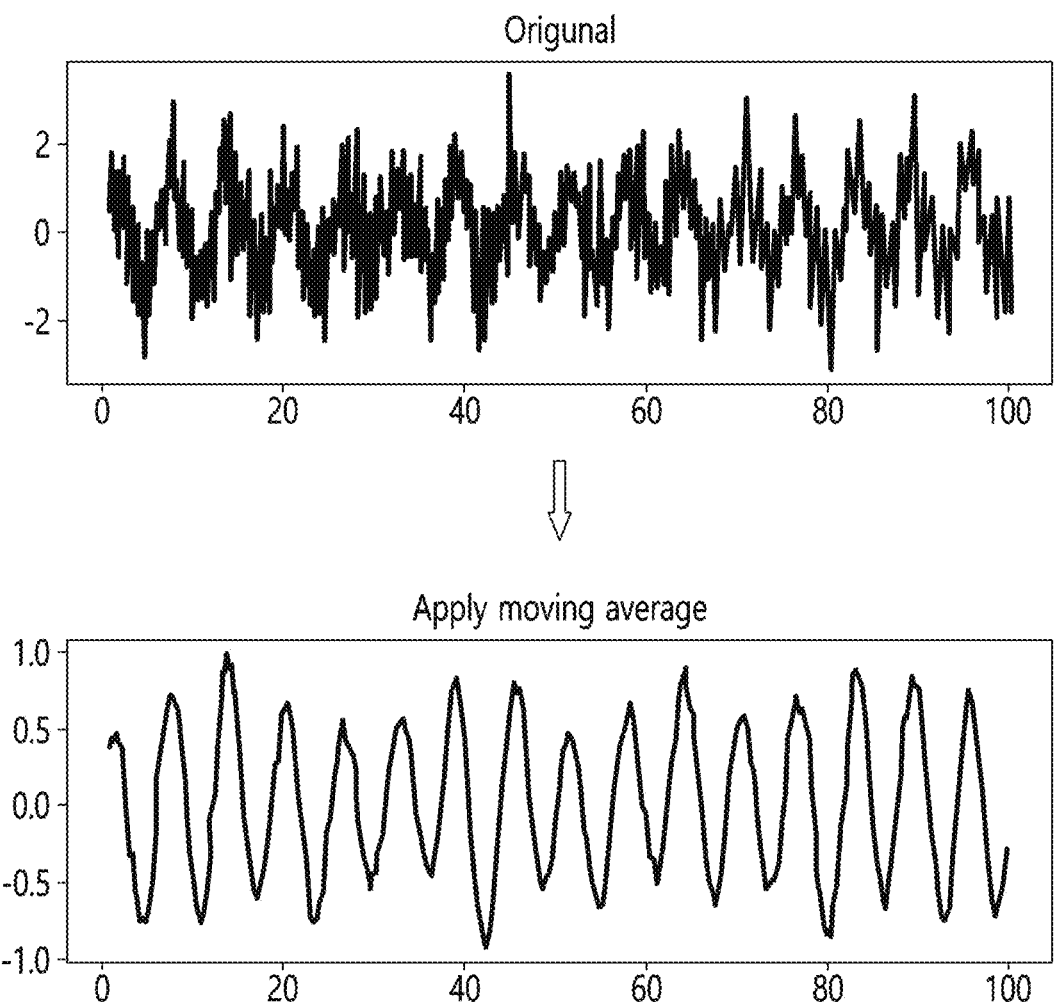
FIG. 5 is a graph for explaining a noise removal process of a signal using the moving average according to an embodiment.

FIG. 5 is a graph for explaining a noise removal process of a signal using the moving average according to an embodiment.

As shown in FIG. 5, applying the moving average causes the signal to have the average value of neighboring signals to remove the noise.

Figure 6:
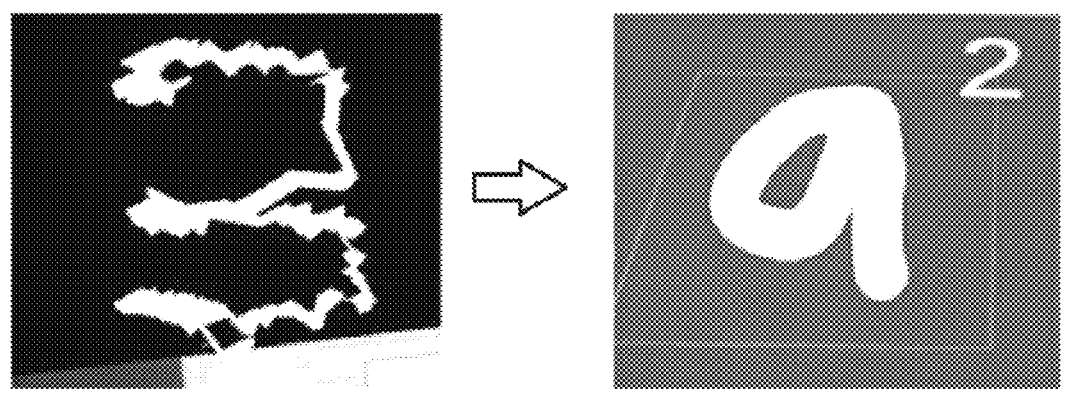
FIG. 6 shows an input result according to the presence or absence of image stabilization according to an embodiment.

FIG. 6 shows an input result according to the presence or absence of image stabilization according to an embodiment.

As shown in FIG. 6, if the image stabilization is not applied, the quality of the text image is degraded to cause a problem in the text recognition. On the contrary, if the image stabilization is applied, the quality of the text image is improved to enable the text to be effectively recognized.

Figure 7:
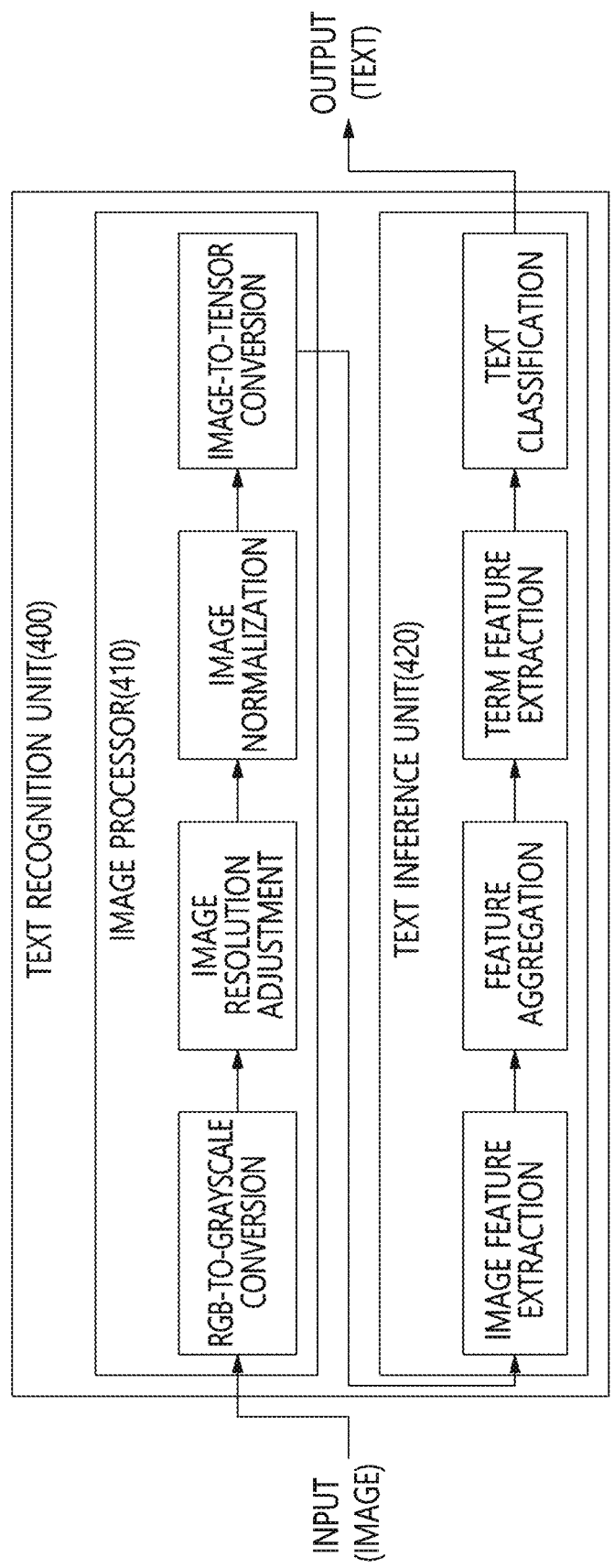
FIG. 7 is a block diagram illustrating a text recognition unit of a text recognition apparatus based on hand interaction for AR glasses according to an embodiment.

FIG. 7 is a block diagram illustrating a text recognition unit of a text recognition apparatus based on hand interaction for AR glasses according to an embodiment according to an embodiment.

Referring to FIG. 7, the text recognition unit 400 according to an embodiment may include an image processor 410 and a text inference unit 420.

The image processor 410 may preprocess the input image so that the input image may be used as an input of the machine-learning model. The text inference unit 420 may recognize the text using the trained machine-learning model from the preprocessed image.

The machine-learning model of the text inference unit 420 may receive only a designated type of image. The preprocessing is required to pass the input image to the text inference unit 420 and this preprocessing may be performed by the image processor 410.

The image processor 410 may perform four operations. First, input 3-channel RGB images are converted into a grayscale image of a single channel and then the magnitude of the resolution of the image may be adjusted to be able to be input to the machine-learning model. Then, each pixel value of the image may be normalized to be 0 to 1. The normalized image may be converted into a tensor to be used for inference. The converted tensor may be used as the input of the text inference unit.

The text inference unit 420 may be configured from machine-learning models, and divided into four types according to their roles. The text inference unit 420 may extract features, aggregate (or combines) the features, extract term features, and classify the text.

Figure 8:
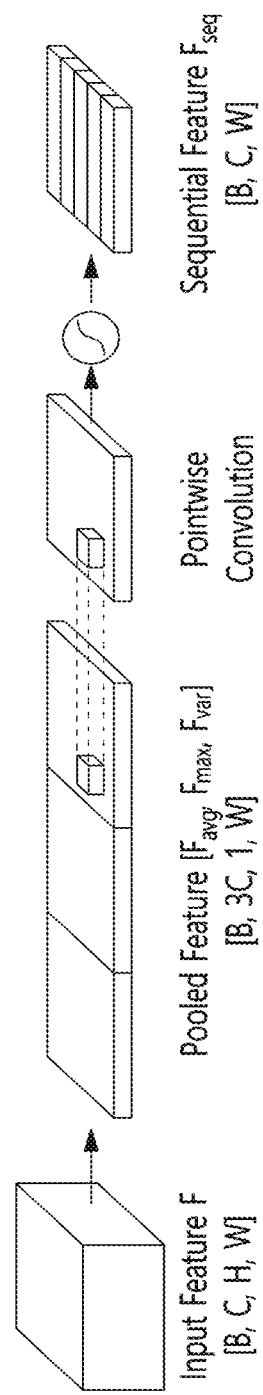
FIG. 8 shows a machine-learning model used in a text recognition unit according to an embodiment.

FIG. 8 shows a machine-learning model used in the text recognition unit according to an embodiment.

As shown in FIG. 8, the machine-learning model for extracting image features may be composed of two-dimensional convolution layers and function to extract the structural features of the text. The machine-learning model may employ a 3-stage structure using a DenseNet architecture, aggregate from simple information such as a color to a straight line, a curved line, and structural information, and extract the features. In addition, attention modules are inserted between the layers to remove less important information such as noises. Furthermore, by assuming that the machine-learning model smoothly operates in an AR environment, a pointwise convolution layer and a depthwise convolution layer may be separately configured to reduce the total capacity.

Referring to FIG. 7 again, the text inference unit 420 may aggregate the features.

Figure 9:
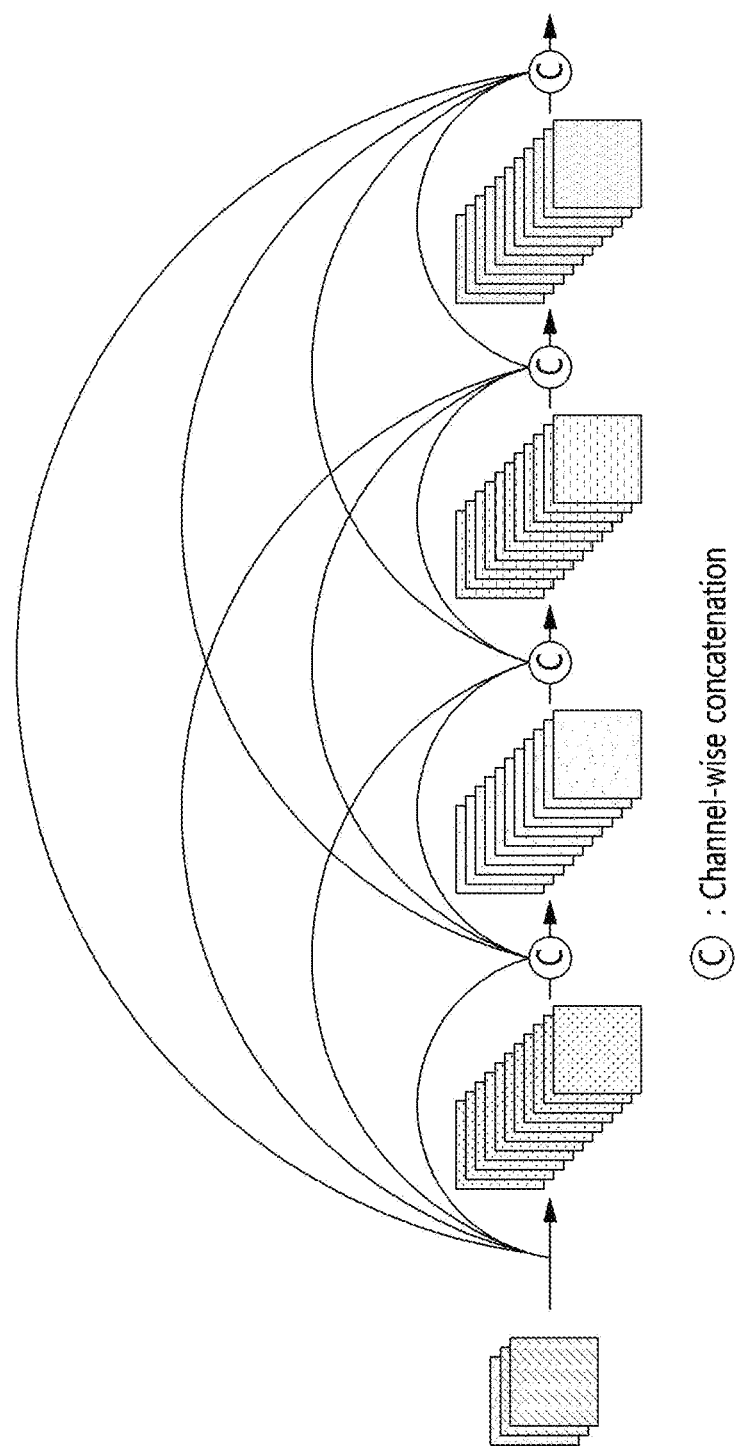
FIG. 9 shows a feature aggregation process performed in a text recognition unit according to an embodiment.

FIG. 9 shows a feature aggregation process performed in a text recognition unit according to an embodiment.

As shown in FIG. 9, the text inference unit 420 of the text recognition unit may aggregate to convert the two-dimensional features into features of one dimension that is the dimension of the text. Here, three statistical values of the average, the maximum and the variance are used for aggregating the features. The aggregation typically uses the average or the combination of the average and the maximum, but the variance is added to increase an information amount to be preserved. In such a configuration, the maximum value, the average value, and the variance value are aggregated, and these three values are finally aggregated into one feature. Here, the pointwise convolution layer may be used for aggregating the features.

Referring back to FIG. 7, the text inference unit 420 may extract the term features. The term features may use the machine-learning model composed of one-dimensional convolution layers, and may aggregate neighboring structural features to extract the term features.

The term feature extraction is divided into short term modeling, mid-term modeling, or long term modeling according to the length of an area to be processed. The longer the area to be processed, the term feature extraction becomes more suitable for processing a high resolution image but the inference speed becomes a little slower.

In the term feature extraction, the term may be determined by inputting in advance the kernel size of the machine-learning model.

The text inference unit 420 may classify the text. The text classification may use the machine-learning model. The machine-learning model is composed of one-dimensional convolution layers, and may finally generate the text from the extracted features through the classification for respective terms.

Figure 10:
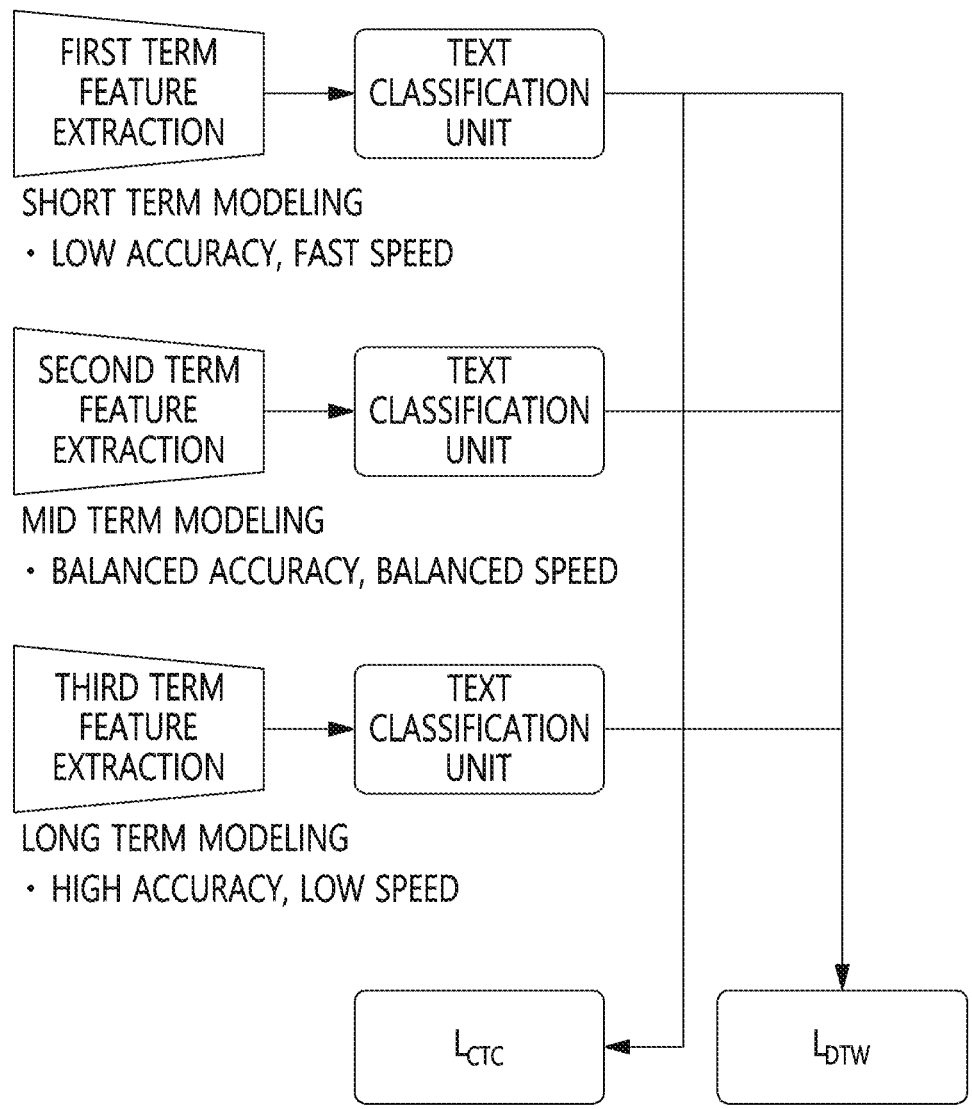
FIG. 10 shows term feature extraction and text classification processes performed in a text recognition unit according to an embodiment.

FIG. 10 shows term feature extraction and text classification processes performed in a text recognition unit according to an embodiment.

As shown in FIG. 10, the term feature extraction and the text classification may be configured in three types in order to have a consistent output from various input resolutions. The term features are divided into the short-term modeling, the mid-term modeling, or the long-term modeling. For the short-term modeling, only a narrow area is used for classifying the text and thus the inference speed is rapid but the accuracy is lowered in case where the resolution becomes high. For the long-term modeling, a wide area is used for classifying the text and thus the inference speed is lower but the performance is good even in case of high resolution.

All the three modeling schemes have to make the same output for the same input, and thus a loss function is required to be set to make the same output. However, the three models have different output lengths and thus employ a dynamic time warping (DTW) loss function used in signal processing. A soft DTW loss function is used in the corresponding implementation.

The DTW represents the similarity of signals as a type of distance. This distance type is different from the Euclidean distance in that two comparison subjects are comparable even though their lengths are different and their comparison points in time do not accurately coincide. The comparison is performed with three combinations such as DTW (short, mid), DTW (short, long), and DTW (mid, long). Total sum of these three combinations is used as the loss. When the loss functions are configured in this way, training is performed as Equation (1) so that their outputs are similar.

$$\text{soft-}DTW^\gamma(x, x') = \min^\gamma_{\{\pi \in A(x,x')\}} \sum_{(i,j) \in \pi} d(x_i, x'_j)^2 \quad (1)$$

Here, A(x,x') denotes a set of possible paths, and d(x,x') denotes a function expressing the similarity between the paths. When features A and B are assumed to be compared, the above paths mean combination of feature points of A and B.

For classifying the text, connectionist temporal classification (CTC) is used as a loss function for comparing ground truth (GT) and the output results. For this CTC, Equation (2) is applied to each of the short term modeling, the mid-term modeling and the long term modeling.

$$P(Y|X) = \sum\nolimits_{A \in \mathcal{A}_{x,y}} \prod\nolimits_{t=1}^{T} p_t(a_t|X) \ CTC(X, Y) = -\log P(Y|X) \quad (2)$$

$$P(Y|X) = \sum_{A \in \mathcal{A}_{x,y}} \prod_{t=1}^{T} p_t(a_t|X) \ CTC(X, Y) = -\log P(Y|X)$$

Here, $A_{X,Y}$ is a set of possible paths and $p_t(a_t|X)$ means a conditional probability of a t-th feature point.

Here, the training using the DTW loss has the characteristics of normalizing the output of the term feature extraction unit and thus hinders the training in the beginning. Therefore, the training using the DTW loss is applied after the training using the CTC loss is sufficiently performed. It is the objective that the corresponding model has the output with the same DTW loss, and thus if the corresponding model is not trained to a certain level with the DTW loss, the model may show low performance in text classification that is the actual objective. Accordingly, for addressing this issue, a separate scheduler is adopted to the DTW loss. As in Equation (3), the DTW is multiplied by t, and this value starts from 0 at the start of the training and gradually increases according to the progress of the training.

$$L_{total} = CTC(X, Y) + \tau \cdot \text{soft-}DTW^\gamma(X, Y) \quad (3)$$

When the DTW loss is applied to the corresponding model, an output mismatch, which occurs in case of configuring only with the CTC loss, may be solved between the long term model and the short term model, and a stable output may be obtained from the inputs of various resolutions. The convolution layer may recognize only a fixed-size area, be configured from the three models according to the size of the area, and be trained so that the same output is output from the same input.

Finally, the trained model selects the term feature extraction according to the purpose. If the resolution of the input image is low, the model applied with the short-term modeling is used, and if the resolution is variable, the model applied with the mid-term modeling is used. If the long-term modeling is applied to a low-resolution image, a recognition range for each character is wide and thus several characters may be recognized as one character. Therefore, it is required to select a suitable model for the optimal accuracy.

Figure 11:
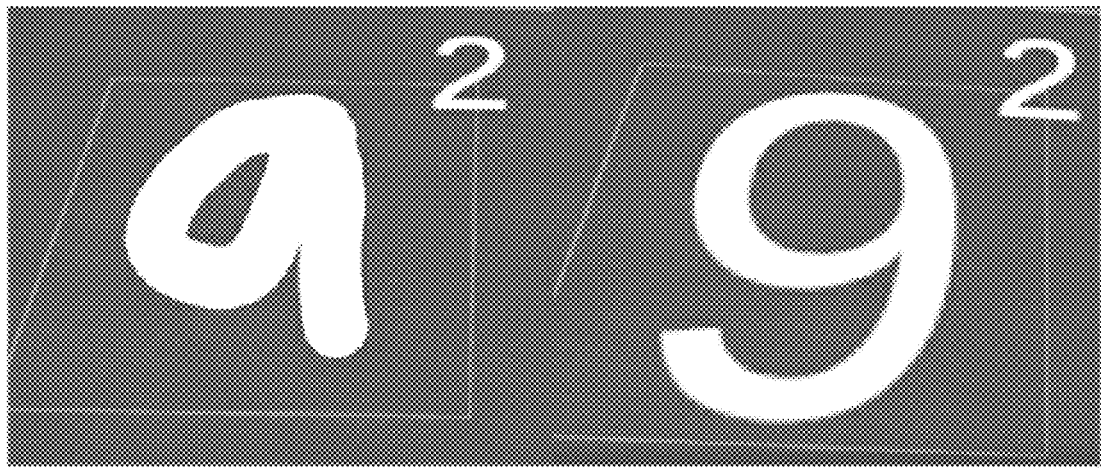
FIG. 11 shows a result recognized by a text recognition unit according to an embodiment.

FIG. 11 shows a recognition result from a text recognition unit according to an embodiment.

As shown in FIG. 11, it may be understood that, in comparison to the typical text recognition result (left), the text recognition result according to the embodiment (right) shows that the text is more effectively recognized.

Figure 12:
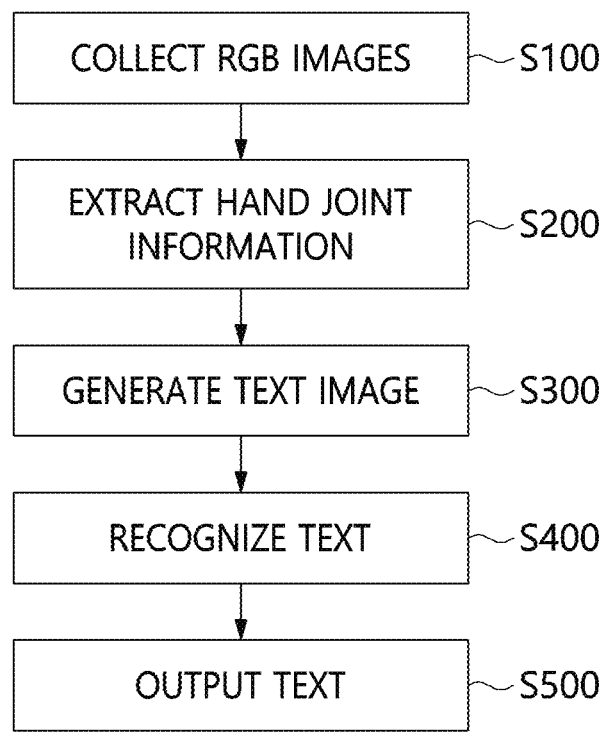
FIG. 12 is a flowchart illustrating a text recognition method based on hand interaction for AR glasses according to an embodiment.

FIG. 12 is a flowchart illustrating a text recognition method based on hand interaction for AR glasses according to an embodiment.

As shown in FIG. 12, the text recognition method based on hand interaction for AR glasses according to AR glasses according to an embodiment may include step S100 of collecting RGB images, step S200 of extracting hand joint information, step S300 of generating a text image, step S400 of recognizing text, and step S500 of outputting the text. Here, the text recognition method based on hand interaction for AR glasses according to the embodiment may be performed in a text recognition apparatus.

The text recognition apparatus according to an embodiment may collect the RGB images from the frontward camera of Nreal glasses at step S100. The text recognition apparatus according to an embodiment may estimate hand gestures in the RGB images. The text recognition apparatus according to the embodiment may extract the hand joint information based on the hand gestures at step S200.

The text recognition apparatus according to an embodiment may extract the text image based on the hand joint information at step S300. The text recognition apparatus according to an embodiment may perform image stabilization during generation of the text image.

The text recognition apparatus according to an embodiment may recognize the text from the generated image at step S400. The text recognition apparatus according to an embodiment may preprocess the text image, and extract the text using the machine-learning model.

The text recognition apparatus according to an embodiment may output the recognized text to the Nreal glasses at step 500.

The text recognition apparatus based on hand interaction for AR glasses according to an embodiment may be implemented in a computer system such as a computer-readable recording media.

Figure 13:
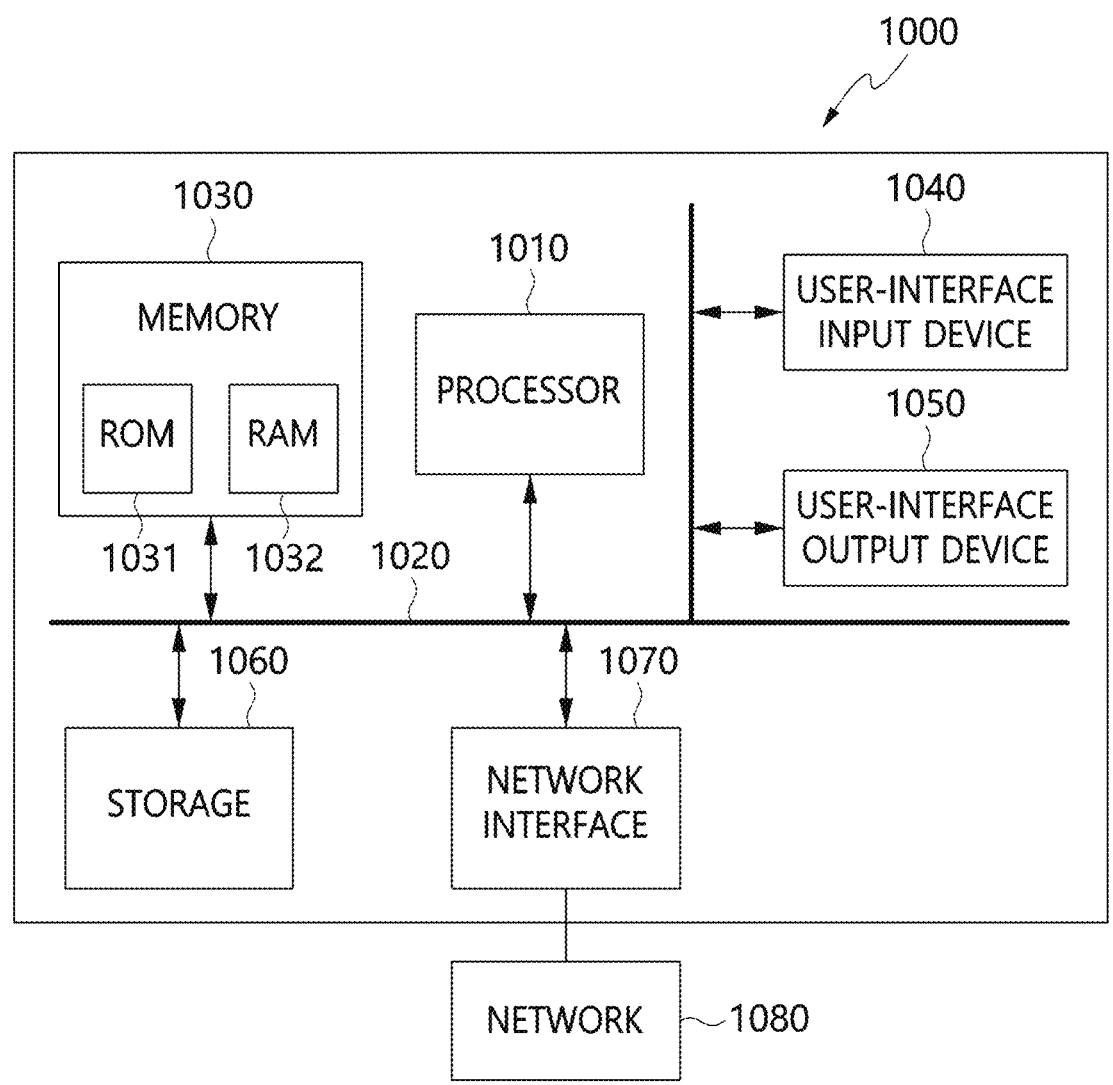
FIG. 13 is a block diagram illustrating the configuration of a computer system according to an embodiment.

FIG. 13 is a block diagram illustrating the configuration of the computer system according to an embodiment.

Referring to FIG. 13, a computer system 1000 according to an embodiment may include one or more processors 1010, memory 1030, a user interface input device 1040, a user interface output device 1050, and storage 1060, which communicate with each other through a bus 1020. The computer system 1000 may further include a network interface 1070 connected to a network 1080.

The processor 1010 may be a central processing unit, or a semiconductor device configured to execute a program or processing instructions stored in the memory 1030 or the storage 1060. The processor 1010 is a type of a central processing unit and may control overall operations of the text recognition apparatus based on hand interaction for AR glasses.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an Application-Specific Integrated Circuit (ASIC), a Field-Programmable Gate Array (FPGA), etc., without being limited thereto.

The memory 1030 may store various types of data for overall operations such as a control program for performing the text recognition method based on hand interaction for AR glasses according to an embodiment. Specifically, the memory 1030 may store various application programs driven in the text recognition apparatus based on hand interaction for AR glasses, and data and instructions for the operations of the text recognition apparatus based on hand interaction for AR glasses.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

The embodiments use a deep learning-based optical character recognition apparatus and image stabilization method to reduce wrong inputs, and thus a stable text input is possible.

In addition, the embodiments may use a machine-learning model including convolution layers to improve the processing speed and accuracy.

In addition, the embodiments may be applied to the mobile or AR glass environment.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A text recognition method, comprising:
   collecting RGB images;
   extracting hand joint information from the RGB images;
   generating a text image based on the hand joint information;
   recognizing text from the text image:
   outputting the recognized text,
   wherein recognizing the text comprises:
      preprocessing the text image; and
      inferring the text by inputting the preprocessed text image to a first machine-learning model,
      wherein preprocessing the text image comprises:
         converting the text image into a grayscale image;
         adjusting a resolution of the grayscale image;
         normalizing the image of which the resolution is adjusted so that pixel values of the image are 0 to 1; and
         converting the normalized image into a tensor.

2. The text recognition method of claim 1, wherein extracting the hand joint information comprises:
   estimating a hand gesture from the RGB images; and
   extracting the hand joint information based on the hand gesture.

3. The text recognition method of claim 1, wherein generating the text image comprises:

extracting a raycast point value based on the hand joint information;

performing image stabilization based on the raycast point value to generate an output value, and rendering a line on a canvas User Interface (UI) based on the output value; and converting the rendered canvas UI into rendered image texture to generate texture image information.

4. The text recognition method of claim 3, wherein the image stabilization is performed to comprise:

inputting the raycast point value to a raycast point queue;

removing first k points and last k points among the raycast point values input to the raycast queue; and applying a moving average of the raycast point queue from which the first k points and the last k points are removed, and outputting an output value.

5. The text recognition method of claim 1, wherein inferring the text comprises:

extracting structural features of the text by inputting the preprocessed text image to a second machine-learning model;

converting the structural features of the text into features of one dimension that is a dimension of the text;

extracting features for respective terms by inputting the converted one-dimensional features to a third machine-learning model; and inferring the text based on the features for respective terms.

6. The text recognition method of claim 5, wherein the second machine-learning model is composed of two-dimensional convolution layers, and the third machine-learning model is composed of one-dimensional convolution layers.

7. The text recognition method of claim 5, wherein converting the structural features of the text into features of one dimension that is a dimension of the text is performed using an average value, a maximum value, and a variance value of the features.

8. The text recognition method of claim 5, wherein inferring the text based on the features for respective terms is performed based on a Dynamic Time Warping (DTW) loss function and a Connectionist Temporal Classification (CTC) loss function.

9. A text recognition apparatus, comprising:

a memory configured to store a control program for text recognition; and a processor configured to execute the control program stored in the memory, wherein the processor is configured to collect RGB images, extract hand joint information from the RGB images, generate a text image based on the hand joint information, recognize text from the text image, and output the recognized text, wherein the processor is configured to preprocess the text image, and infer the text by inputting the preprocessed text image to a first machine-learning model, wherein the processor is configured to convert the text image into a grayscale image, adjust a resolution of the grayscale image, normalize the image of which the resolution is adjusted so that pixel values of the image are 0 to 1, and convert the normalized image into a tensor.

10. The text recognition apparatus of claim 9, wherein the processor is configured to estimate a hand gesture from the RGB images and extract the hand joint information based on the hand gesture.

11. The text recognition apparatus of claim 9, wherein the processor is configured to extract a raycast point value based on the hand joint information, perform image stabilization based on the raycast point value to generate an output value, render a line on a canvas User Interface (UI) based on the output value, and convert the rendered canvas UI into rendered image texture to generate texture image information.

12. The text recognition apparatus of claim 11, wherein the processor is configured to input the raycast point value to a raycast point queue, remove first k points and last k points among the raycast point values input to the raycast queue, apply a moving average of the raycast point queue from which the first k points and the last k points are removed, and output an output value to perform the image stabilization.

13. The text recognition apparatus of claim 9, wherein the processor is configured to extract structural features of the text by inputting the preprocessed text image to a second machine-learning model, convert the structural features of the text into features of one dimension that is a dimension of the text, extract features for respective terms by inputting the converted one-dimensional features to a third machine-learning model, and infer the text based on the features for respective terms.

14. The text recognition apparatus of claim 13, wherein the second machine-learning model is composed of two-dimensional convolution layers, and the third machine-learning model is composed of one-dimensional convolution layers.

15. The text recognition apparatus of claim 13, wherein the processor is configured to convert the structural features of the text into features of one dimension that is a dimension of text using an average value, a maximum value, and a variance value of the features.

16. The text recognition apparatus of claim 13, wherein the processor is configured to perform an operation of inferring the text based on the features for respective terms based on a Dynamic Time Warping (DTW) loss function and a Connectionist Temporal Classification (CTC) loss function.

* * * * *